(12) United States Patent
Mizutani et al.

(10) Patent No.: US 8,259,001 B2
(45) Date of Patent: Sep. 4, 2012

(54) WEATHER RADAR AND WEATHER OBSERVATION METHOD

(75) Inventors: Fumihiko Mizutani, Kawasaki (JP); Masakazu Wada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/700,209

(22) Filed: Feb. 4, 2010

(65) Prior Publication Data
US 2010/0328144 A1 Dec. 30, 2010

(30) Foreign Application Priority Data

Jun. 26, 2009 (JP) .................................. 2009-152643
Jan. 29, 2010 (JP) .................................. 2010-017555

(51) Int. Cl.
*G01S 13/00* (2006.01)
(52) U.S. Cl. .......................................... 342/96; 342/147
(58) Field of Classification Search .................... 342/26, 342/73–158
See application file for complete search history.

(56) References Cited

U.S. PATENT DOCUMENTS

| 5,510,796 | A * | 4/1996 | Applebaum | 342/162 |
| 6,407,535 | B1 * | 6/2002 | Friedman et al. | 322/2 R |
| 6,512,476 | B1 * | 1/2003 | Woodell | 342/26 B |
| 7,205,928 | B1 * | 4/2007 | Sweet | 342/26 B |
| 2002/0005798 | A1 * | 1/2002 | Wada et al. | 342/26 |
| 2003/0071753 | A1 * | 4/2003 | Vacanti | 342/173 |
| 2005/0203730 | A1 | 9/2005 | Aoki et al. | |
| 2006/0197699 | A1 * | 9/2006 | Cornic | 342/26 R |

OTHER PUBLICATIONS

Revised Edition "Radar Technology", published by the Institute of Electronics, Information and Communication Engineers, Oct. 1, 1996, 10 pages.
"Revised Radar Technique" supervised by Takashi Yoshida, Institute of Electronics, Information and Communication Engineers, Oct. 1, 1996, first edition, "Chapter 9, Meteorological Radar", 2 pages.
U.S. Appl. No. 12/821,614, filed Jun. 23, 2010, Ishizawa, et al.
U.S. Appl. No. 12/825,740, filed Jun. 29, 2010, Mizutani, et al.
U.S. Appl. No. 12/825,819, filed Jun. 29, 2010, Mizutani, et al.
U.S. Appl. No. 13/013,189, filed Jan. 25, 2011, Mizutani, et al.

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

A weather radar includes an antenna unit configured to transmit a radio wave from a plurality of antenna elements, and receive a reflected wave from a weather target by carrying out beam scanning in an elevation angle direction by phase control, a drive unit configured to control an elevation angle of an aperture of the antenna unit, and a controller configured to cause the antenna unit to carry out the beam scanning in a state where the aperture is faced to a point which presents a maximum range in the observational range by the drive unit, and direct, at a time point when the weather target is detected based on a received signal of the reflected wave, the aperture toward the weather target by the drive unit.

6 Claims, 4 Drawing Sheets

WEATHER RADAR AND WEATHER OBSERVATION METHOD

CROSS-REFERENCE TO RELATED APPLICATIONS

This application is based upon and claims the benefit of priority from prior Japanese Patent Applications No. 2009-152643, filed Jun. 26, 2009; and No. 2010-017555, filed Jan. 29, 2010, the entire contents of both of which are incorporated herein by reference.

BACKGROUND OF THE INVENTION

1. Field of the Invention

The present invention relates to a weather radar, and weather observation method configured to observe a weather phenomenon such as rain, cloud, and the like.

2. Description of the Related Art

In the conventional weather radar of the parabolic antenna type, a pencil beam with sharp directivity is formed, the beam is rotated 360° in the horizontal direction to acquire observation data in one plane, and then the antenna elevation angle is increased stepwise to continue to acquire the next one plane data, thereby collecting three-dimensional precipitation data (see, for example, "Revised Radar Technique" supervised by Takashi Yoshida, Institute of Electronics, Information and Communication Engineers, Oct. 1, 1996, first edition, "Chapter 9, Meteorological Radar", pp. 239-240). In order to carry out this observation sequence, a time of about five to ten minutes is required, and hence temporal/spatial resolution sufficient for observation of a cumulonimbus cloud or the like changing every moment has not been obtained. Accordingly, in the weather radar using the conventional parabolic antenna, it has been difficult to detect an unexpected and local weather phenomenon such as abrupt development of a cumulonimbus cloud.

BRIEF SUMMARY OF THE INVENTION

According to an aspect of the present invention, it is provided that a weather radar including: an antenna unit configured to transmit a radio wave from a plurality of antenna elements, and receive a reflected wave from a weather target by carrying out beam scanning in an elevation angle direction by phase control; a drive unit configured to control an elevation angle of an aperture of the antenna unit; and a controller configured to cause the antenna unit to carry out the beam scanning in a state where the aperture is faced to a point which presents a maximum range in the observational range by the drive unit, and direct, at a time point when the weather target is detected based on a received signal of the reflected wave, the aperture toward the weather target by the drive unit.

According to another aspect of the present invention, it is provided that a weather observation method used for a weather radar including an antenna unit configured to transmit a radio wave from a plurality of antenna elements, and receive a reflected wave from a weather target by carrying out beam scanning in an elevation angle direction by phase control, and a drive unit configured to control an elevation angle of an aperture of the antenna unit, including: causing the antenna unit to carry out beam scanning in a state where the aperture is faced to a point which presents a maximum range in the observational range by the drive unit; and directing, at a time point when the weather target is detected based on a received signal of the reflected wave, the aperture toward the weather target by the drive unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below in detail while referring to the accompanying drawings.

Figure 1:
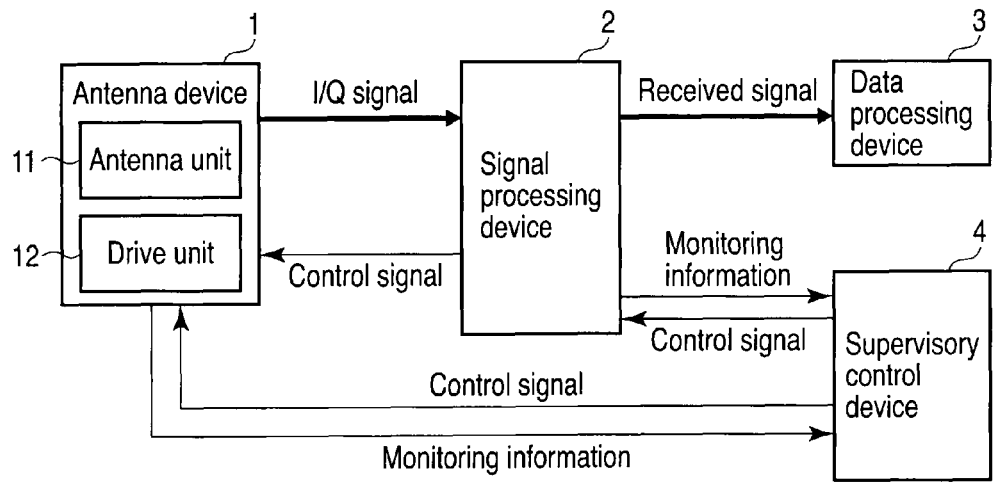
FIG. 1 is a view showing a configuration example of a weather radar according to an embodiment of the present invention.

FIG. 1 is a view showing a configuration example of a weather radar according to an embodiment of the present invention.

In FIG. 1, this weather radar includes an antenna device 1, a signal processing device 2, a data processing device 3, and a supervisory control device 4.

The antenna device 1 includes an antenna unit 11, and a drive unit 12.

The antenna unit 11 includes, for example, a one-dimensional phased array antenna in which a plurality of antenna elements are arranged in the vertical direction. The antenna unit 11 transmits a radio wave from the plurality of antenna elements in accordance with a control signal from the signal processing device 2, and receives a reflected wave from a weather target such as precipitation or the like by carrying out beam scanning in the elevation angle direction by phase control.

It is necessary for the weather radar to observe a weather target in the arbitrary space, and hence the drive unit 12 mechanically controls the azimuth angle and elevation angle of the aperture of the antenna unit 11 in accordance with a control signal from the supervisory control device 4 by rotation of a drive motor, and the like.

On the other hand, upon reception of a reflected wave from a weather target in the space by the antenna unit 11, the antenna device 1 subjects the received analog signal to A/D conversion, then subjects the digital signal to I (in-phase)/Q (quadrature) detection, and supplies the detected I/Q signal to the signal processing device 2.

The signal processing device 2 calculates the received power and Doppler velocity from the I/Q signal supplied from the antenna device 1. Further, the signal processing device 2 transmits a phase control signal used to determine the transmitting angle of the radar wave to the antenna device 1 in accordance with the control signal from the supervisory control device 4.

The data processing device 3 calculates the precipitation intensity and Doppler velocity after correction from the received power and Doppler velocity calculated by the signal processing device 2.

Besides transmitting a control signal to each device on the basis of an observation sequence to be described later, the supervisory control device 4 collectively manages monitoring information on each device.

Figure 2:
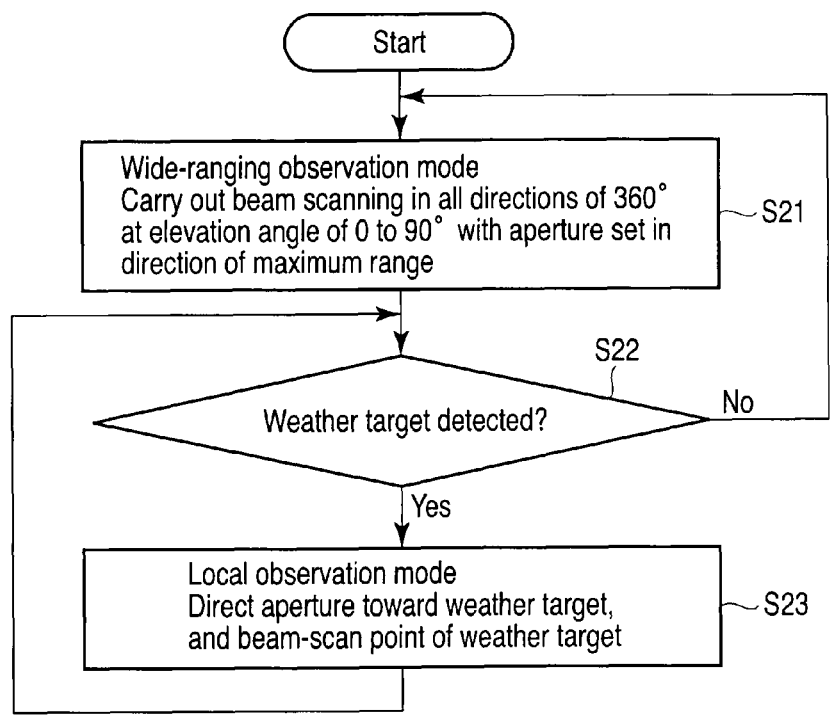
FIG. 2 is a flowchart showing an observation sequence of the weather radar of FIG. 1.

Next, an observation sequence to be executed by the weather radar configured as described above will be described below. FIG. 2 is a flowchart showing the observation sequence.

Figure 3:
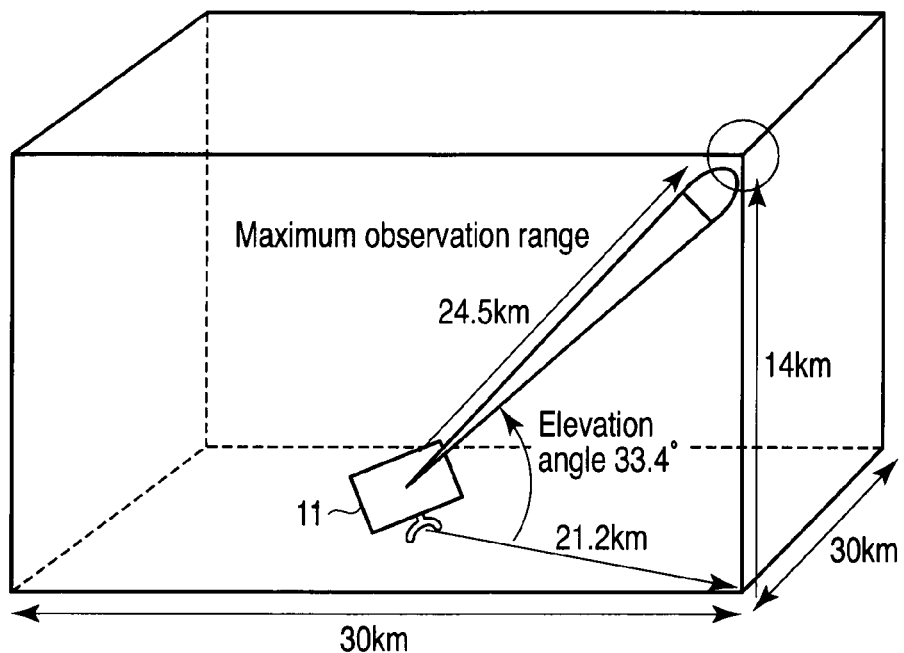
FIG. 3 is a view showing an operation in the wide-ranging observation mode.

In step S21, the weather radar operates in a wide-ranging observation mode shown in FIG. 3 in fine weather or at a stage before detecting a weather target. That is, the supervisory control device 4 causes the antenna unit 11 to carry out beam scanning in all directions of 360° at an elevation angle of 0 to 90° in a state where the antenna aperture is faced to a point which presents a maximum detectable range in the observational range by the drive unit 12.

Figure 4:
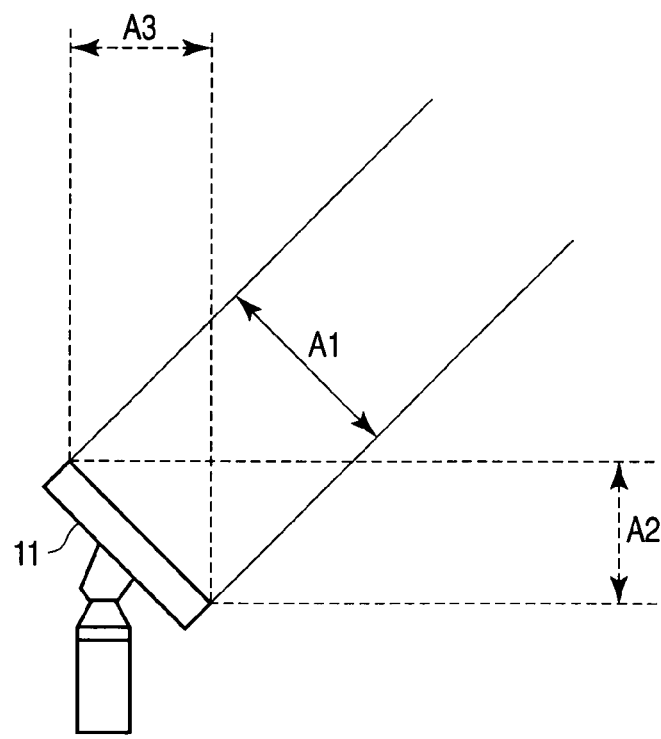
FIG. 4 is a view showing a relationship between the elevation angle of the antenna aperture and effective aperture area.
Figure 5:
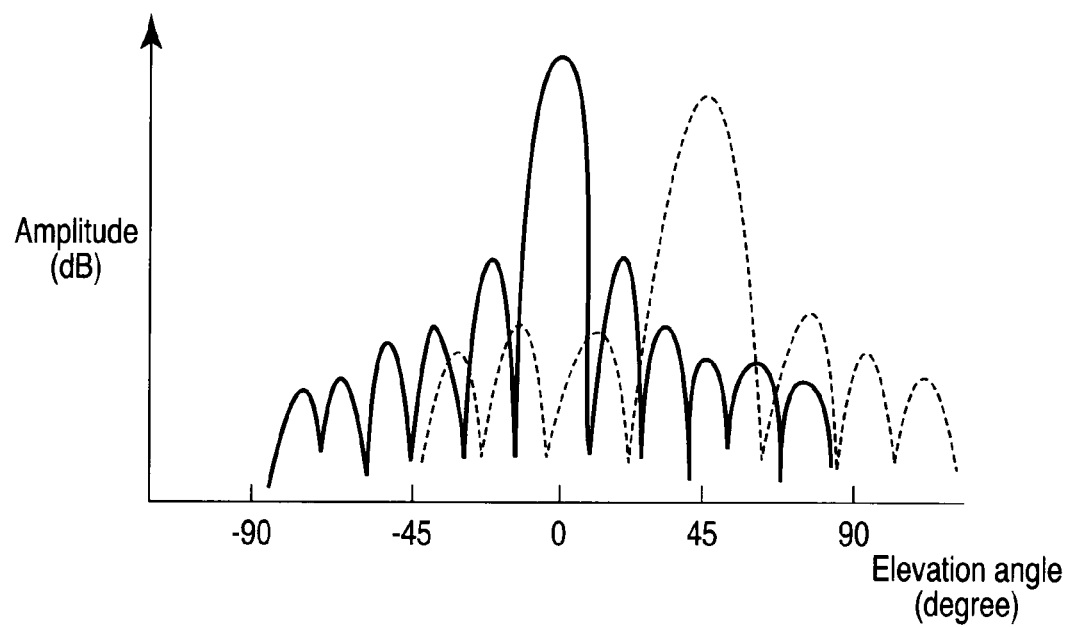
FIG. 5 is a view showing a relationship between the elevation angle of the antenna aperture and beamwidth.

FIG. 4 is a view showing a relationship between the elevation angle of the antenna aperture and effective aperture area of the antenna. FIG. 5 is a view showing a relationship between the elevation angle of the antenna aperture and beamwidth. As shown in A1 in FIG. 4, the effective aperture area is maximized in the direction of the maximum detectable range of the antenna, and as shown in A2 and A3 in FIG. 4, the effective aperture area becomes smaller as the beam formation position becomes farther from the direction of the maximum detectable range of the antenna. As shown in FIG. 5, the larger the antenna effective aperture area, the narrower the beamwidth becomes, and the higher the directional gain becomes. On the other hand, the smaller the antenna effective aperture area, the wider the beamwidth becomes, and the lower the gain becomes. When the gain is lowered, it becomes impossible for the weather radar to detect gentle rain or the like. Accordingly, the supervisory control device 4 controls the elevation angle of the antenna aperture to critically direct the beam center position toward the weather target in accordance with the observation conditions.

Figure 6:
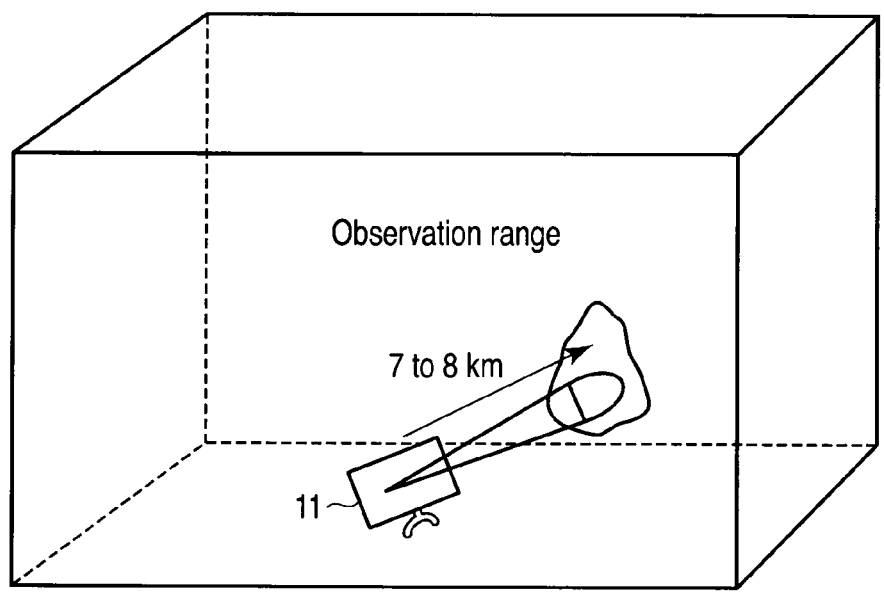
FIG. 6 is a view showing an operation in the local observation mode.

In step S22, when a weather target is detected from a received signal of a reflected wave by the signal processing device 2, the flow is shifted to step S23, and the weather radar operates in a local observation mode shown in FIG. 6. The supervisory control device 4 causes the drive unit 12 to direct the antenna aperture toward the weather target, and causes the antenna unit 11 to beam-scan a point corresponding to a distance to the weather target and size of the weather target. For example, the antenna aperture is controlled in such a manner that the elevation angle thereof is an angle making it possible to obtain the maximum received power intensity of the received signal.

As described above, in the above-mentioned embodiment, in the weather radar provided with a phased array antenna, in fine weather or the like, beam scanning is carried out in all directions of 360° at an elevation angle of 0 to 90° in the state where the antenna aperture is faced to a point which presents a maximum detectable range in the observation range, and when a weather target such as a nimbus or the like is detected, the antenna aperture is directed toward the weather target to thereby cause the antenna to beam-scan a point corresponding to the distance to the weather target and size of the weather target.

By configuring the weather radar in the manner described above, it becomes possible to critically direct the beam center position toward the weather target in accordance with the observation conditions, and appropriately observe an unexpected and local weather phenomenon such as abrupt development of a cumulonimbus cloud.

Figure 7:
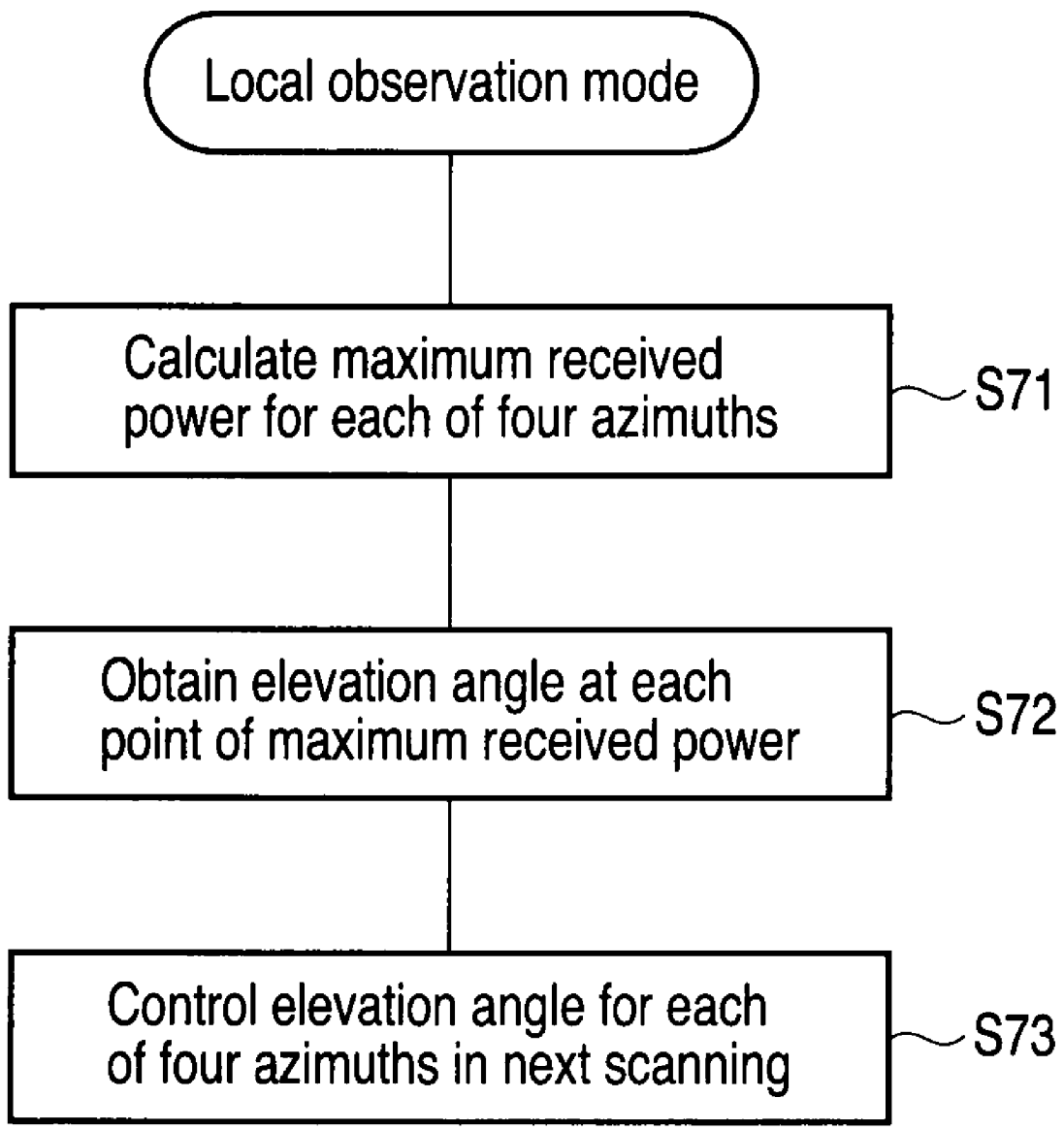
FIG. 7 is a view showing another example of an observation sequence in the local observation mode.

Furthermore, in the local observation mode in above step S23, it is possible to employ an observation sequence shown in FIG. 7. In step S71, the supervisory control device 4 calculates the maximum received power for each of first to fourth azimuths formed by dividing, for example, the azimuth angle of 360° into four parts on the basis of the value of the received power calculated by the signal processing device 2. In step S72, the supervisory control device 4 obtains an elevation angle at each point of the maximum received power. In step S73, the supervisory control device 4 controls the drive unit 12 in such a manner that the antenna aperture takes the above-mentioned elevation angle for each of the first to fourth azimuths in the next scanning. As described above, by directing the antenna aperture toward the weather target for each of the plurality of azimuths, it becomes possible to observe the weather phenomenon with a higher degree of accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A weather radar comprising:
    an antenna unit configured to transmit a radio wave to a weather target from a plurality of antenna elements, and receive a reflected wave from the weather target by carrying out beam scanning in an elevation angular direction by phase control;
    a drive unit configured to control an angle of an aperture surface of the antenna unit; and
    a controller configured to cause the antenna unit to carry out the beam scanning in order to detect the weather target by the phase control in a state where the aperture surface is faced to a farthermost point in a predetermined observational range, and, control the drive unit to cause the aperture surface to face toward the weather target detected based on a received signal of the reflected wave.

2. The weather radar according to claim 1, wherein the controller controls the angle of the aperture surface based on a received power intensity of the received signal.

3. The weather radar according to claim 1, wherein the controller calculates, at a time point when the weather target is detected, a maximum value of the received power intensity from the received signal for each of a plurality azimuths, and controls the angle of the aperture surface for each of the azimuths based on the maximum value.

4. A weather observation method used for a weather radar comprising an antenna unit configured to transmit a radio wave to a weather target from a plurality of antenna elements, and receive a reflected wave from the weather target by carrying out beam scanning in an elevation angular direction by phase control, and a drive unit configured to control an angle of an aperture surface of the antenna unit, comprising:
    causing the antenna unit to carry out beam scanning in order to detect the weather target by the phase control in a state where the aperture surface is faced to a farthermost point in a predetermined observational range; and controlling the drive unit to cause the aperture surface to face toward the weather target detected based on a received signal of the reflected wave.

5. The weather observation method according to claim 4, further comprising controlling the angle of the aperture surface based on a received power intensity of the received signal.

6. The weather observation method according to claim 4, further comprising:

calculating, at a time point when the weather target is detected, a maximum value of the received power intensity from the received signal for each of a plurality azimuths, and controls; and controlling the angle of the aperture surface for each of the azimuths based on the maximum value.

* * * * *